Figure 1:
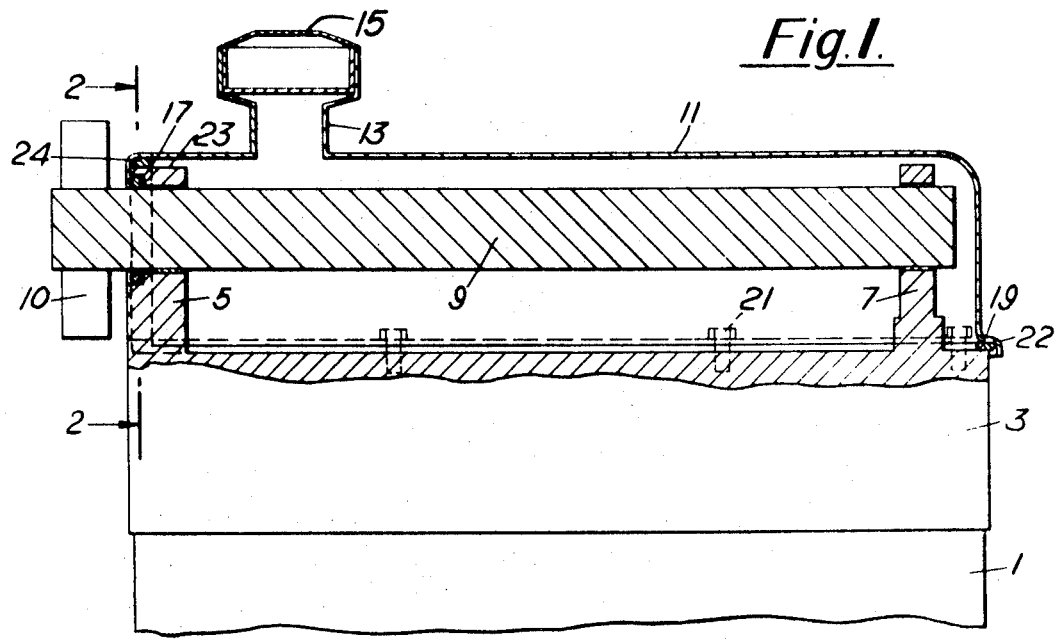

United States Patent

[11] 3,625,527

| [72] | Inventor | Brian N. Brindle<br>Thundersley, England |
|---|---|---|
| [21] | Appl. No. | 22,947 |
| [22] | Filed | Mar. 26, 1970 |
| [45] | Patented | Dec. 7, 1971 |
| [73] | Assignee | Ford Motor Company<br>Dearborn, Mich. |
| [32] | Priority | July 15, 1969 |
| [33] | | Great Britain |
| [31] | | 35,463/69 |

[54] ENGINE GASKET
9 Claims, 3 Drawing Figs.

[52] U.S. Cl................................................. 277/227, 123/90.38
[51] Int. Cl..................................................... F16j 15/10
[50] Field of Search......................................... 123/90.38; 277/227, 235, 235 B, DIG. 6

[56] References Cited
UNITED STATES PATENTS

| 2,109,814 | 3/1938 | Balfe | 277/235 B |
| 2,209,230 | 7/1940 | Kosatka | 277/227 |
| 2,234,625 | 3/1961 | Diehl et al. | 277/227 |

*Primary Examiner*—Robert I. Smith
*Attorneys*—John R. Faulkner and Robert W. Brown ABSTRACT: A gasket of particular value for use in an overhead camshaft engine. Gasket provides a seal between cylinder head boss in which camshaft is journaled and rocker cover, and between the cylinder head and rocker cover. Part of the gasket between boss and rocker cover is made of a softer material than is part between cylinder head and rocker cover. Gasket may be made from mixtures of rubber and cork granules, the relative hardness properties being determined by proportions of rubber and cork used, and by the hardness of the rubber compounds used in the respective parts of the gasket.

INVENTOR.
BRIAN NORMAN BRINDLE

ENGINE GASKET

THE INVENTION

This invention relates to an engine gasket. More particularly, this invention relates to an engine gasket suitable for use as a seal between an engine rocker cover and cylinder head, and it is of particular value as a seal between such rocker cover and the cylinder head of an overhead camshaft internal-combustion engine.

In overhead camshaft engines, the camshaft, with associated valve gear, is usually enclosed within a sheet metal rocker cover. There is a problem in sealing the rocker cover to the cylinder head where the camshaft projects beyond the cylinder block. In this area, the conventional sealing gasket is not compressed between two opposed flat surfaces, but is merely located between two correspondingly shaped curved surfaces.

The engine gasket according to this invention is of particular value when used in an engine having an overhead camshaft which is journaled in bosses projecting from the cylinder head. The camshaft projects axially at one end beyond the cylinder head and carries a pulley, sprocket or the equivalent for driving the camshaft from the crankshaft. A rocker cover encloses the camshaft and there is a running seal between the camshaft and the journal opening in the boss adjacent the pulley, sprocket or equivalent. The gasket is interposed between the rocker cover and the cylinder head and between the boss adjacent the pulley, sprocket or equivalent and the rocker cover. The part of the gasket between the boss and cover is made of a softer material than the remaining part or parts of the gasket.

Figure 2:
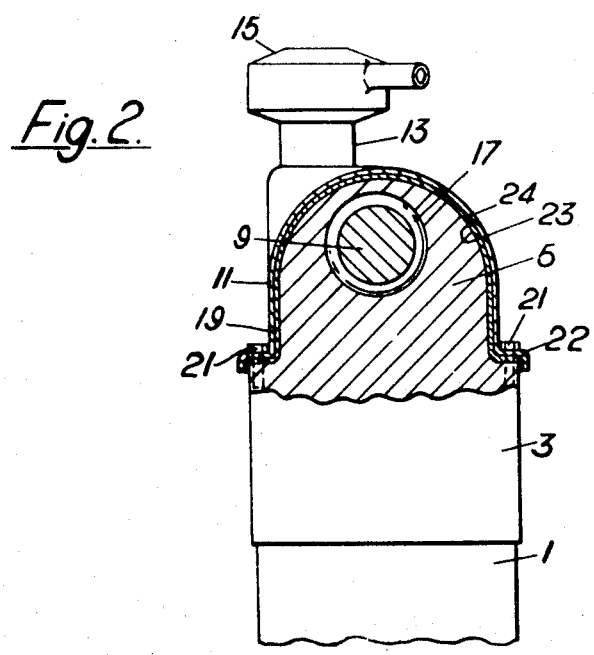
Figure 3:
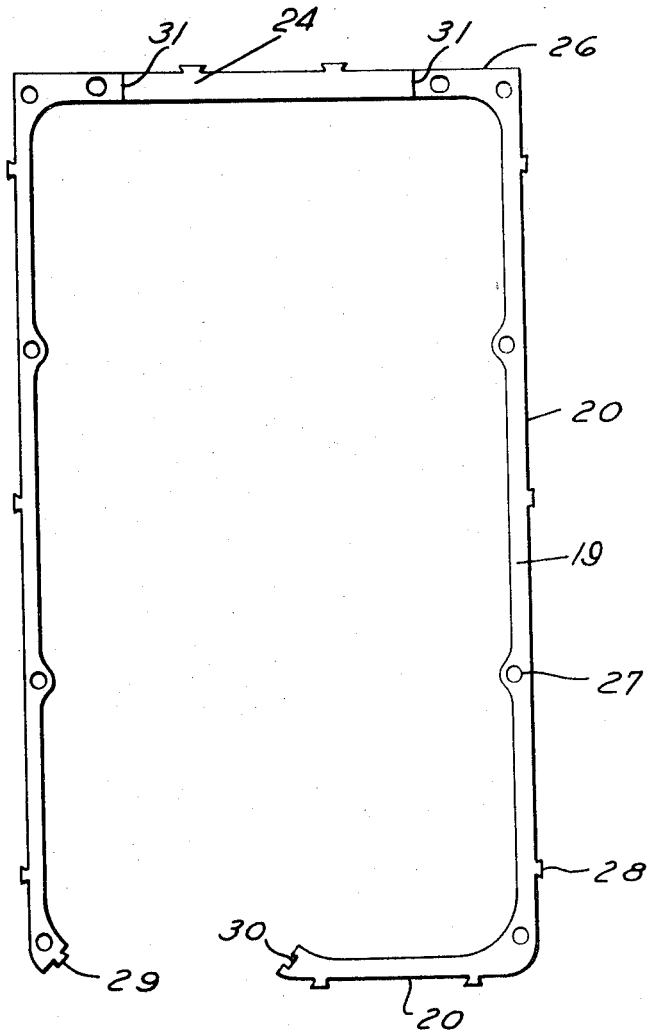

The invention is hereinafter more particularly described with reference to the accompanying drawings, in which:

FIG. 1 is a diagrammatic vertical section through an engine;
FIG. 2 is a section on the line 2—2 in FIG. 1; and
FIG. 3 is a plan view of a gasket used in the engine.

The engine is essentially a conventional overhead camshaft engine and has a cylinder block 1 and cylinder head 3 bolted to the block 1, as shown in FIGS. 1 and 2.

Two bosses 5 and 7 are integral with and project upwardly from the cylinder head 3. The bosses have aligned openings in which a conventional overhead camshaft 9 is journaled. The camshaft 9 projects axially beyond the cylinder head and carries a pulley, sprocket or the equivalent 10 for driving the camshaft from the crankshaft (not shown).

The camshaft and, of course, the engine valve gear are enclosed within a sheet metal rocker cover 11 in which there is an oil filler opening 13 closed by a cap 15.

An O-ring 17 is located in the boss 5 and so forms a running seal in the journal opening in the boss adjacent the pulley, sprocket or equivalent 10. The O-ring prevents the escape of fluid through the journal opening.

The problem with which this invention is concerned is sealing the rocker cover 11 to the cylinder head 3 to thereby prevent escape of fluid.

For the purpose of preventing this escape of fluid, a gasket 19, made in accordance with the invention, is interposed between the rocker cover 11 and the cylinder head 3. This gasket may be seen most clearly in FIG. 3, which shows the gasket in its disassembled form. In this form, gasket 19 is essentially rectangular in shape and is rectangular in cross section. The gasket 19 is uniform in thickness, and in the preferred design, it has a thickness equal to about one-third the width of its sides 20. As is shown in FIG. 3, the gasket 19 may have portions of greater width, such as side 26. The gasket over the greater part of its length lies on the flat perimeter of cylinder head 3 and is engaged by a flat peripheral flange 22 of the rocker cover. Bolts 21, by which the cover is attached to the cylinder head, pass through holes 27 in the gasket and are screwed up to compress the gasket. The dovetail tabs 28 mate with similar slots in the rocker cover to locate the gasket during assembly. The use of dovetail tabs 28 makes gluing the gasket to the rocker cover or cylinder head unnecessary. Dovetail tab 29 mates with dovetail slot 30 to join together the ends of gasket 19.

The rocker cover 11 is shaped to conform with the semicylindrical shape of the boss 5. The gasket 19, when assembled on the engine, has a U-shaped part 24 which is between the curved outer surface 23 of the boss 5 and the corresponding shaped part of the rocker cover. In this region, the rocker cover is not attached directly to the boss 5. There is, consequently, a difficulty in effecting a seal between the rocker cover 11 and the boss 5 since the gasket in this area is not directly compressed by tightening up bolts.

The part 24 (FIG. 3) of the gasket between bond lines 31 is made of a softer material than the remainder of the gasket, and the gap between the cover 11 and curved surface 23 of the boss is such that this relatively soft material of the gasket is sufficiently compressed to ensure an adequate seal. If the whole of the gasket were made of the same material as the part 24, then the greater length of the gasket compressed between the flat perimeter of the cylinder head and flat peripheral flange 22 of the cover would be liable to be damaged when the bolts 21 were tightened, whereas, if the part 24 of the gasket were made of the same relatively hard material as the remainder of the gasket, then the combined result of manufacturing tolerance and the absence of any bolts attaching the cover to the boss 5 might result in the gasket being insufficiently compressed to form a seal. By utilizing different compositions in the two lengths of the gasket, such as different proportions of cork to rubber or rubber of different hardness properties, it is possible to ensure that the gasket is adequately compressed over its whole length to form a seal.

The gasket is made of a mixture of nitrile rubber and cork granules in the conventional manner. The part 24 is made separately from the remainder of the gasket and is subsequently bonded to it at suitably located bond lines 31.

What is claimed is:

1. A gasket of generally rectangular cross section for use in forming a seal between the rocker cover and the cylinder head of an engine, which comprises a first part which, when in use, is interposed between curved surfaces of the rocker cover and cylinder head to form a seal, and a second part bonded to the ends of the first part which, when in use, is interposed between flat surfaces of the rocker cover and cylinder head to form a seal, the first part being made from a softer material than the second part, the gasket in use forming a seal along its length when compressed between the rocker cover and the cylinder head.

2. A gasket in accordance with claim 1, wherein the softer first part is comprised of a mixture of rubber and cork granules, and wherein the second part is comprised of a different mixture of rubber and cork granules.

3. A gasket in accordance with claim 2, wherein the proportion of cork to rubber in the softer first part is different from the proportion of cork to rubber in the second part.

4. A gasket in accordance with claim 2, wherein the rubber in the second part is harder than the rubber in the softer first part.

5. A gasket in accordance with claim 4, wherein the proportion of cork to rubber in the softer first part is different from the proportion of cork to rubber in the second part.

6. A gasket for an overhead camshaft internal combustion engine having a boss with a curved surface projecting from the cylinder head and the camshaft journaled in and projecting axially through the boss to a point beyond the cylinder head, the gasket being intended to form a seal between a rocker cover and the curved surface of the boss through which the camshaft extends beyond the cylinder head and also between the rocker cover and a flat surface of the cylinder head, wherein the part of the gasket intended to form a seal between the rocker cover and the boss is made from a softer material than the remaining part of said gasket intended to form a seal between the rocker cover and the flat surface of the cylinder head, the ends of the softer part being bonded to the remaining part to form the complete gasket, whereby it is possible to ensure that the gasket is adequately compressed over its entire length to form a seal.

7. A gasket in accordance with claim 6, wherein the softer part is made of a mixture of nitrile rubber and cork granules, and wherein the remaining part is made from a different mixture of rubber and cork granules.

8. A gasket in accordance with claim 7, wherein the rubber in the remaining part of the gasket is harder than the rubber in the softer part of the gasket.

9. A gasket in accordance with claim 8, wherein the proportion of cork to rubber in the softer part is different from the proportion of cork to rubber in the remaining part.

* * * * *